(12) United States Patent
Baker

(10) Patent No.: US 9,386,743 B2
(45) Date of Patent: Jul. 12, 2016

(54) DOOR LIFT AND HANDLE FOR WALK BEHIND MOWER

(71) Applicant: Husqvarna AB, Huskvarna (SE)

(72) Inventor: David J. Baker, Fort Lawn, SC (US)

(73) Assignee: HUSQVARNA AB, Huskvarna (SE)

( * ) Notice: Subject to any disclaimer, the term of this patent is extended or adjusted under 35 U.S.C. 154(b) by 27 days.

(21) Appl. No.: 14/199,092

(22) Filed: Mar. 6, 2014

(65) Prior Publication Data

US 2014/0260157 A1 Sep. 18, 2014

Related U.S. Application Data

(60) Provisional application No. 61/789,844, filed on Mar. 15, 2013.

(51) Int. Cl.
*A01D 34/82* (2006.01)
*A01D 43/063* (2006.01)
*A01D 34/71* (2006.01)

(52) U.S. Cl.
CPC .............. *A01D 34/824* (2013.01); *A01D 34/71* (2013.01); *A01D 43/063* (2013.01)

(58) Field of Classification Search
CPC ... A01D 34/001; A01D 34/003; A01D 34/71; A01D 34/82; A01D 34/824; A01D 43/0631–43/0638
See application file for complete search history.

(56) References Cited

U.S. PATENT DOCUMENTS

| 2,736,153 | A | | 2/1956 | Dunn |
| 2,786,694 | A | * | 3/1957 | Gray ......................... 280/47.371 |
| 3,721,078 | A | | 3/1973 | Haffner |
| 3,764,156 | A | * | 10/1973 | Nepper et al. ............. 280/47.36 |
| 3,791,116 | A | * | 2/1974 | Wykhuis ........................ 56/17.5 |
| 3,893,284 | A | | 7/1975 | Kaesgen et al. |
| 3,962,852 | A | | 6/1976 | Boyer |
| 3,971,198 | A | * | 7/1976 | Lane .............................. 56/202 |

(Continued)

FOREIGN PATENT DOCUMENTS

| DE | 2115921 A1 | 8/1972 |
| DE | 9411192 U1 | 9/1994 |

(Continued)

OTHER PUBLICATIONS

International Search Report and Written Opinion of PCT/US2009/031996 mailed Oct. 16, 2009.

(Continued)

*Primary Examiner* — Alicia Torres
*Assistant Examiner* — Adam Behrens
(74) *Attorney, Agent, or Firm* — Nelson Mullins Riley & Scarborough LLP

(57) ABSTRACT

A lawn mower may include a blade housing configured to house at least one blade, an engine, a handle assembly, a door, and a bag lifting assembly. The blade housing may include an exit. The engine may be supported at least in part by the blade housing to selectively rotate the at least one blade. The handle assembly may guide operation of the lawn mower. The door may be rotatably disposed to have a first rest position in contact with a bagging attachment disposed to receive clippings from the blade housing and a second rest position proximate to the blade housing when the bagging attachment is removed. The bag lifting assembly may be configured to lift the door from the first rest position responsive to rotation of the handle assembly forward from an operating position.

20 Claims, 13 Drawing Sheets

(56) References Cited

U.S. PATENT DOCUMENTS

| | | | |
|---|---|---|---|
| 4,753,062 A * | 6/1988 | Roelle | 56/10.5 |
| 4,897,988 A | 2/1990 | Schweitz et al. | |
| 4,984,419 A * | 1/1991 | Sampei et al. | 56/202 |
| 6,698,173 B2 * | 3/2004 | Joseph | 56/16.7 |
| 7,231,755 B2 * | 6/2007 | Clarke | 56/14.7 |
| 7,448,195 B2 | 11/2008 | Kohler | |
| 8,578,691 B2 * | 11/2013 | Lahey et al. | 56/202 |
| 9,038,356 B2 * | 5/2015 | Shao et al. | 56/16.7 |
| 2002/0084117 A1 * | 7/2002 | Joseph | 180/19.3 |
| 2003/0182919 A1 | 10/2003 | Baumann et al. | |
| 2005/0109002 A1 | 5/2005 | Peter et al. | |
| 2005/0188664 A1 * | 9/2005 | Clarke | 56/14.7 |
| 2006/0053762 A1 | 3/2006 | Stover et al. | |
| 2011/0302899 A1 * | 12/2011 | Park | 56/202 |
| 2011/0308217 A1 * | 12/2011 | Lahey et al. | 56/16.7 |
| 2012/0260619 A1 * | 10/2012 | Haraqia et al. | 56/16.9 |
| 2013/0111866 A1 * | 5/2013 | Schmalz | 56/17.5 |
| 2014/0047811 A1 | 2/2014 | Lahey et al. | |

FOREIGN PATENT DOCUMENTS

| | | |
|---|---|---|
| EP | 0903074 A1 | 3/1999 |
| EP | 1452085 A2 | 9/2004 |
| EP | 1591002 A1 | 11/2005 |
| EP | 1690444 A1 | 8/2006 |
| EP | 2476303 A1 | 7/2012 |
| GB | 1585875 A | 3/1981 |
| WO | 2010085258 A1 | 7/2010 |
| WO | 2012115543 A1 | 8/2012 |

OTHER PUBLICATIONS

International Preliminary Report on Patentability for PCT/US2009/031996 issued Jul. 26, 2011.

International Search Report and Written Opinion of PCT/SE2011/050188 mailed on Sep. 30, 2011.

Chapter I of the International Preliminary Report on Patentability of PCT/SE2011/050188 issued on Aug. 21, 2013.

* cited by examiner

DOOR LIFT AND HANDLE FOR WALK BEHIND MOWER

TECHNICAL FIELD

Example embodiments generally relate to outdoor power equipment and, more particularly, relate to a walk behind lawn mower with a door lift and handle.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically relatively compact, have comparatively small engines and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers and/or the like) in addition to grass cutting components. Riding lawn mowers can also be ruggedly built and have sufficient power, traction, and handling capabilities to enable operators to mow over rough terrain, if needed.

Walk behind models are often used when smaller lots or tighter areas are to be mowed. Some, relatively simple walk behind models may move responsive only to the pushing force provided by the operator. However, other models may provide power to the wheels to assist the operator relative to providing mobility for the lawn mower. In many instances, the lawn mower may have power provided to either the front set of wheels, or the back set of wheels. The power may be provided, for example, to be selectively powered off the same shaft that turns a blade for cutting grass. The grass that is cut may be expelled out the back end of the lawn mower. In some cases, a bagging attachment may be provided to catch the clippings of grass that is cut by the lawn mower. In other cases, the cut grass may be ejected from the cutting deck of the lawn mower, or the cut grass may be mulched.

Some lawn mowers that include a bagging attachment may have a door provided to alternate between being held in a closed position on top of the bagging attachment, or being in a closed position that closes off the rear exit out the back of the lawn mower cutting deck. The user will typically need to lift the door to remove the bagging attachment or to allow the bagging attachment to be replaced. However, if the door could be manipulated without the user having to hold it, the user would have two free hands to handle the bagging attachment. Even so, the handle may be in the way relative to effectively allowing the operator to access the door. Thus, it may be desirable to improve the operability and accessibility of the door.

BRIEF SUMMARY OF SOME EXAMPLES

Some example embodiments may therefore provide for improved performance of a lawn mower by providing a door lift and handle that may, in some cases, work together to provide improved access while minimizing the requirement for the user to manually manipulate the door. In this regard, for example, some embodiments may provide a door lift mechanism that can be operated via movement of the handle so that by moving the handle in a manner that enables better access to the rear of the mower, the door is also moved and/or held in an advantageous position to facilitate access to the bagging attachment or rear of the mower.

In an example embodiment, a lawn mower may be provided. The lawn mower may include a blade housing configured to house at least one blade, an engine, a handle assembly, a door, and a bag lifting assembly. The blade housing may include an exit. The engine may be supported at least in part by the blade housing to selectively rotate the at least one blade. The handle assembly may guide operation of the lawn mower. The door may be rotatably disposed to have a first rest position in contact with a bagging attachment disposed to receive clippings from the blade housing and a second rest position proximate to the blade housing when the bagging attachment is removed. The bag lifting assembly may be configured to lift the door from the first rest position responsive to rotation of the handle assembly forward from an operating position.

In accordance with another example embodiment, a lawn mower including a blade housing configured to house at least one blade, an engine, a handle assembly, and a handle rotation assembly is provided. The blade housing may include an exit. The engine may be supported at least in part by the blade housing to selectively rotate the at least one blade. The handle assembly may guide operation of the lawn mower. The handle rotation assembly may include a handle adjustment bracket and a retractable member. The handle adjustment bracket may have a plurality of discrete lockable positions between which the handle assembly is rotatable. The retractable member may be operably coupled to the handle assembly to selectively engage the handle adjustment bracket at a selected one of the discrete lockable positions based on operator action.

Some example embodiments may provide for improving the operator experience relative to the ease of use and convenience associated with emptying the bagging attachment and overall operability of the lawn mower.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
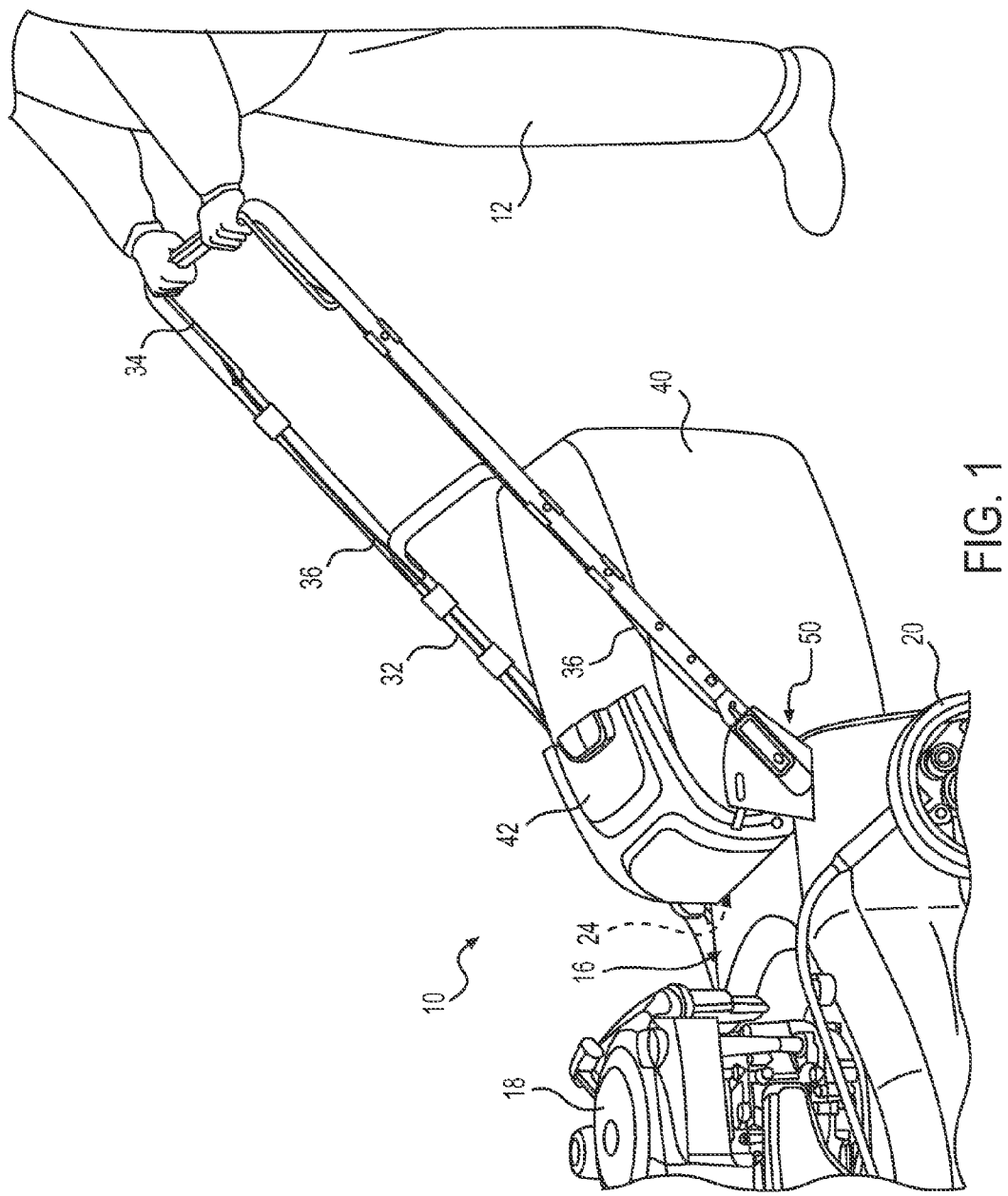
FIG. 1 illustrates a perspective view of a walk-behind lawn mower according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

FIG. 1 illustrates a perspective view of a walk-behind lawn mower 10 of an example embodiment. An operator 12 is located in an operator location behind the lawn mower 10. The lawn mower 10 of FIG. 1 includes a blade housing 16 that may house a rotatable cutting blade (not shown). The cutting blade may be suspended above the ground at the end of a rotatable shaft (e.g., a drive shaft—again not shown in FIG. 1) that may be turned responsive to operation of an engine 18, such as a gasoline powered engine or an electric motor. Operation of the engine 18 may be initiated by a recoil starter via pulling of a recoil starter handle by the operator. However, in other embodiments, the engine 18 may alternatively be started via a key, switch or other similar device.

The lawn mower 10 may include a mobility assembly on which a substantial portion of the weight of the lawn mower 10 may rest when the lawn mower 10 is stationary. The mobility assembly may also provide for movement of the lawn mower 10. In some cases, the mobility assembly may be driven via power from the engine 18 that may be selectively provided to ground engaging wheels 20, which make up the mobility assembly.

In some examples, the ground engaging wheels 20 may be adjustable in their respective heights. Adjusting the height of the front wheels and/or the back wheels may be employed in order to provide a level cut and/or to adjust the height of the cutting blade. In some embodiments, a local wheel height adjuster may be provided at the front wheels and/or the back wheels. However, in other embodiments, remote wheel height adjustment may also or alternatively be possible.

Rotation of the cutting blade may generate grass clippings, and/or other debris that may be ejected from the blade housing 16. In some cases, the clippings/debris may be ejected from a side or rear of the blade housing 16. When a rear discharge 24 is employed, many such lawn mowers may employ a bagging attachment 40 to collect discharged clippings/debris. However, bagging attachments may also be used for side discharge models in some cases. The bagging attachment 40 may be removable to enable the operator to empty the bagging attachment 40. In an example embodiment, a rear door 42 may be provided to mate with the bagging attachment 40 when the lawn mower 10 is ready to cut grass with the bagging attachment 40 attached, and to close off the rear of the blade housing 16 for operation without the bagging attachment 40.

In an example embodiment, the lawn mower 10 may further include a handle assembly. The handle assembly of FIG. 1 may include two handle members 32 that extend generally rearward and upward from opposing sides of a rear portion of the blade housing 16. The handle members 32 may be substantially parallel to each other and may be connected to each other at their distal ends via a cross bar. The handle members 32 may be adjustable in length or may be foldable to reduce the amount of space that the lawn mower 10 consumes when stored or shipped.

In some embodiments, various controls may be provided proximate to the cross bar and/or one or more of the handle members 32. For example, a trigger controller (not shown) may be provided in some cases. Additionally or alternatively, an operator bail 34 may be provided. When the operator bail 34 is held proximate to the cross bar, power may be enabled to be delivered to either or both of the ground engaging wheels 20 via a drive system of the lawn mower 10. In this regard, for example, holding the operator bail 34 in a pulled position (as shown in FIG. 1) may cause tension to be provided to a cable 36, which may be communicated to a transmission or other component of the lawn mower 10. The operator bail 34 or the trigger controller (if employed) may therefore be used, e.g., via operable coupling provided by the cable 36) to provide for remote actuation of various control functions. For example, pulling either or both of the movable members of the trigger controller may cause adjustments to be made to one or more transmissions of the lawn mower 10 or may cause movement of components to actuate shifting from no drive operation (e.g., zero-wheel drive where movement is only responsive to operator pushing) to a powered drive configuration. In some cases, however, the trigger controller may be replaced by a lever, knob, or other actuation device that may be operably coupled to a speed change gear, one or more transmissions or linkages associated therewith.

In an example embodiment, the remote actuator (e.g., the trigger controller or the operator bail 34) may be configured to indicate that the operator 12 is present and intends to operate the lawn mower 10 for cutting grass. In some embodiments, the operator bail 34, which is shown to be held in a pulled position, where the operator 12 pulls the operator bail 34 toward the cross bar, may also be pushed forward to a pushed position, which will be described in greater detail below. When the operator bail 34 is neither in the pulled position or the pushed position, the operator bail 34 may be in a rest position that is between the pulled position and the pushed position.

To facilitate rotation of the handle assembly, the cable 36 may provide tension down the length of the cable to facilitate rotation of the handle assembly when the operator bail 34 is put into the pushed position. In this regard, a handle rotation assembly 50 may be provided to enable the handle members 32 to be rotated forward when the operator bail 34 is in the pushed position. In some embodiments, the handle rotation assembly 50 may further be provided in connection or cooperation with a bag lifting assembly. FIGS. 2-6 show examples of various structural embodiments for implementation of the handle rotation assembly 50. FIG. 7 illustrates a closer perspective view of an operator bail disposed at a handle assembly according to an example embodiment. FIGS. 8-14 show examples of various structural embodiments for implementation of the bag lifting assembly.

Figure 2:
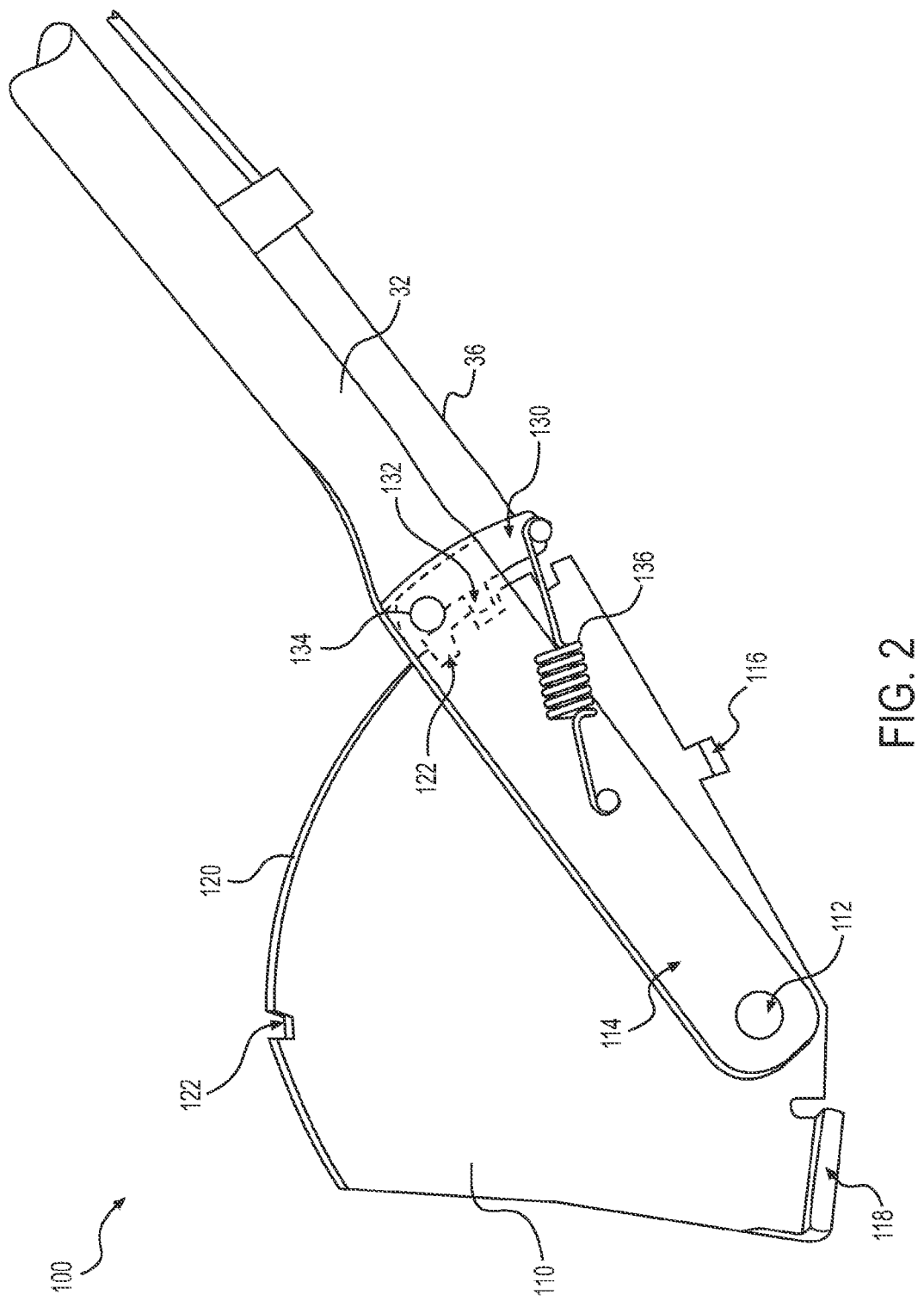
FIG. 2 illustrates a side view of a handle rotation assembly according to an example embodiment.
Figure 3:
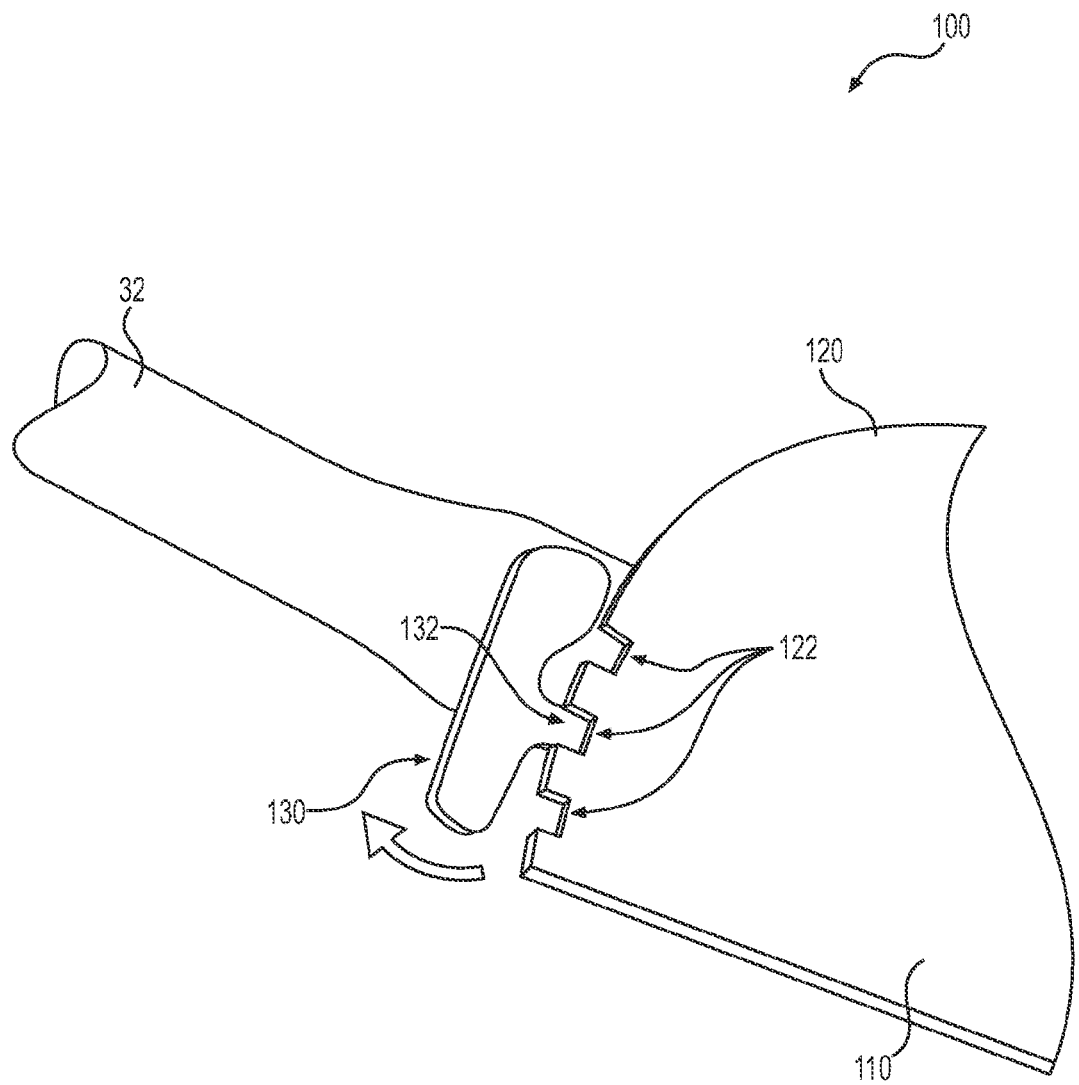
FIG. 3 illustrates the handle rotation assembly of FIG. 2 from a reverse angle in accordance with an example embodiment.

FIG. 2 illustrates one example embodiment of a handle rotation assembly. FIG. 3 illustrates the handle rotation assembly of FIG. 2 from a reverse angle. In this regard, the handle rotation assembly 100 of FIGS. 2 and 3 (which is one example of the handle rotation assembly 50 of FIG. 1) includes a handle adjustment bracket 110 that is fixed proximate to the rear portion of the blade housing 16. The handle adjustment bracket 110 may include an axle bar 112 extending therefrom to form a pivot axis for an end portion 114 of the handle member 32. The handle adjustment bracket 110 may be a substantially flat metallic component having a first stop 116 and a second stop 118 disposed to define the maximum rotational limits of the handle member 32. In this regard, the first stop 116 may define a maximum rearward rotational position for the handle member 32 and the second stop 118 may define a maximum forward rotational position for the handle member 32. The handle member 32 may be rotated to the second stop 118 for storage or shipping purposes to minimize the height of the handle assembly.

As shown in FIGS. 2 and 3, the handle adjustment bracket 110 may have an arcuate portion 120 that may extend along one side of the handle adjustment bracket 110. In this example, the arcuate portion 120 is on an opposite side to the side on which the second stop 118 is provided, and is on a side adjacent to the side on which the first stop 116 is provided. The arcuate portion 120 may have a plurality of notches 122 disposed at various points along the surface of the arcuate portion 120. Each of the notches 122 may represent a discrete handle position in which the handle rotation assembly 100 may enable the handle member 32 to be rotated to when the operator bail 34 is in the pushed position. In an example embodiment a pawl assembly 130 may be provided with at least one pawl 132 extending therefrom to be inserted into one of the notches 122 to hold the handle member 32 in a corresponding position.

The pawl assembly 130 may include a pivot 134 disposed at one end thereof. Meanwhile, the end of the pawl assembly 130 that is opposite the pivot 134 may be operably coupled to a biasing element (e.g., spring 136) and to the cable 36. The biasing element may be configured to provide a force to seat the pawl 132 in one of the notches 122 if the pawl 132 is aligned with one of the notches 122. Meanwhile, the cable 36 may pull the pawl 132 away from the handle adjustment bracket 110 so that if the pawl 132 was seated in one of the notches 122, the pawl 132 may be unseated to allow the handle member 32 to be rotated relative to the handle adjustment bracket 110.

When the operator bail 34 is moved forward to the pushed position, the pawl 132 may be withdrawn from one of the notches 122 as the pawl assembly 130 rotates about the pivot 132. The operator bail 34 could be returned to the rest position and the pawl 132 would then ride along the arcuate portion 120 until the next one of the notches 122 is encountered. When the next one of the notches 122 is encountered by the pawl 132, the spring 136 may draw the pawl 132 into the next one of the notches 122 to thereby lock the handle member 32 in a corresponding orientation.

As can be appreciated from FIG. 2, a forward most one of the notches 122 may be provided to hold the handle member 32 in a substantially upright position to provide access to the bagging attachment 40. Meanwhile, a plurality of notches 122 may be provided at a rear portion of the handle adjustment bracket 110 to enable the operator 12 to set the height of the handle assembly. It should be appreciated also that, although FIGS. 1-3 only show one side of the lawn mower 10 having the handle rotation assembly 100, symmetrical actuators may be provided on both sides of the lawn mower 10 in some embodiments.

Figure 4:
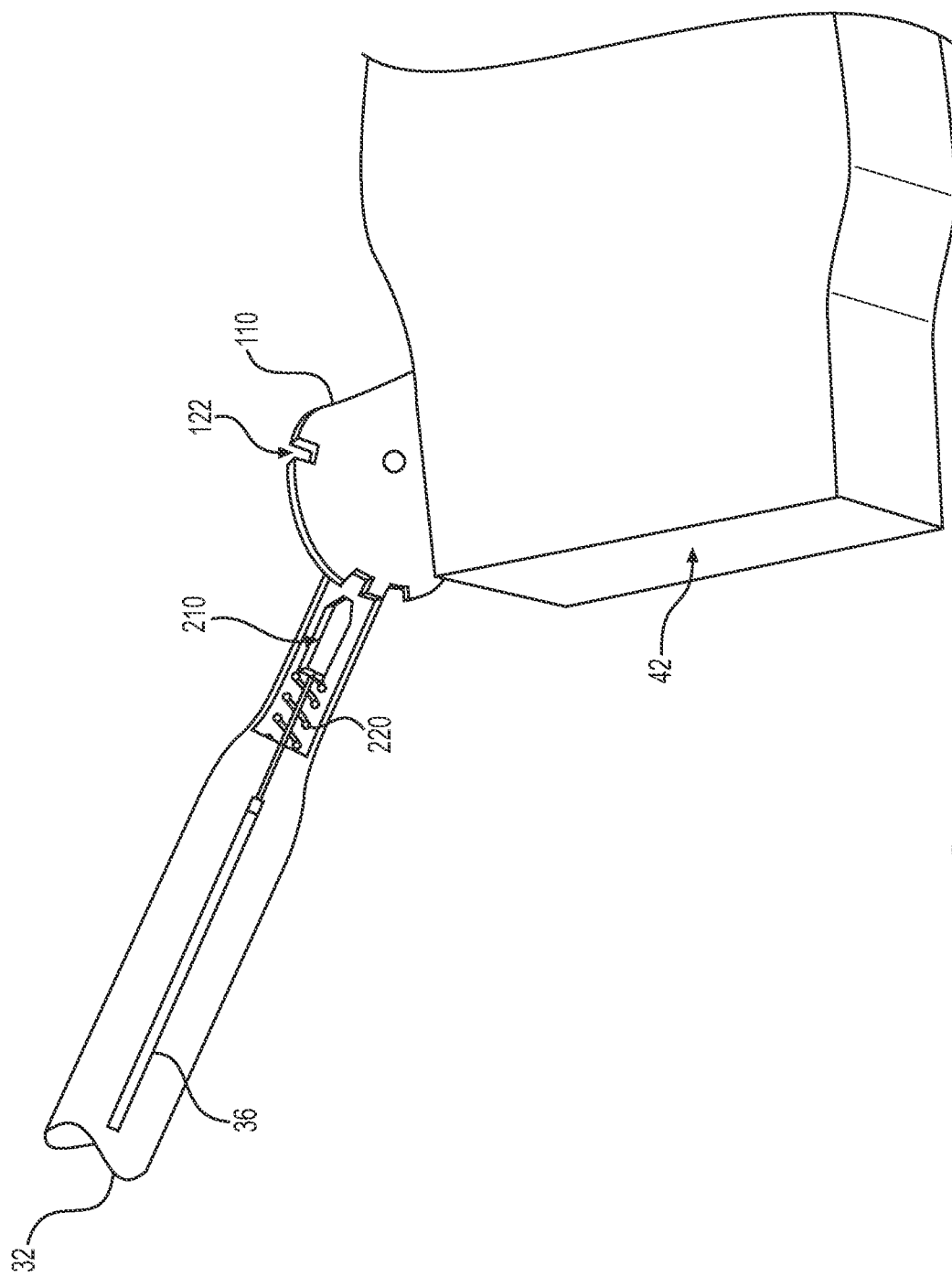
FIG. 4 illustrates a perspective view of an alternative structure for the handle rotation assembly according to an example embodiment.

It should also be appreciated that although FIGS. 1-3 illustrate example embodiments in which the cables 36 extend outside of the handle members 32, alternative embodiments may be provided in which the cables 36 run inside of the handle members 32. In this regard, FIG. 4 illustrates an example handle rotation assembly 200 in which a pin 210 rides within a slot inside the handle member 32. A spring 220 may be provided to push the pin 210 into the notches 122. However, otherwise, the handle rotation assembly 200 of FIG. 4 may operate substantially similar to the operation described above for the examples of FIGS. 1-3.

Figure 5:
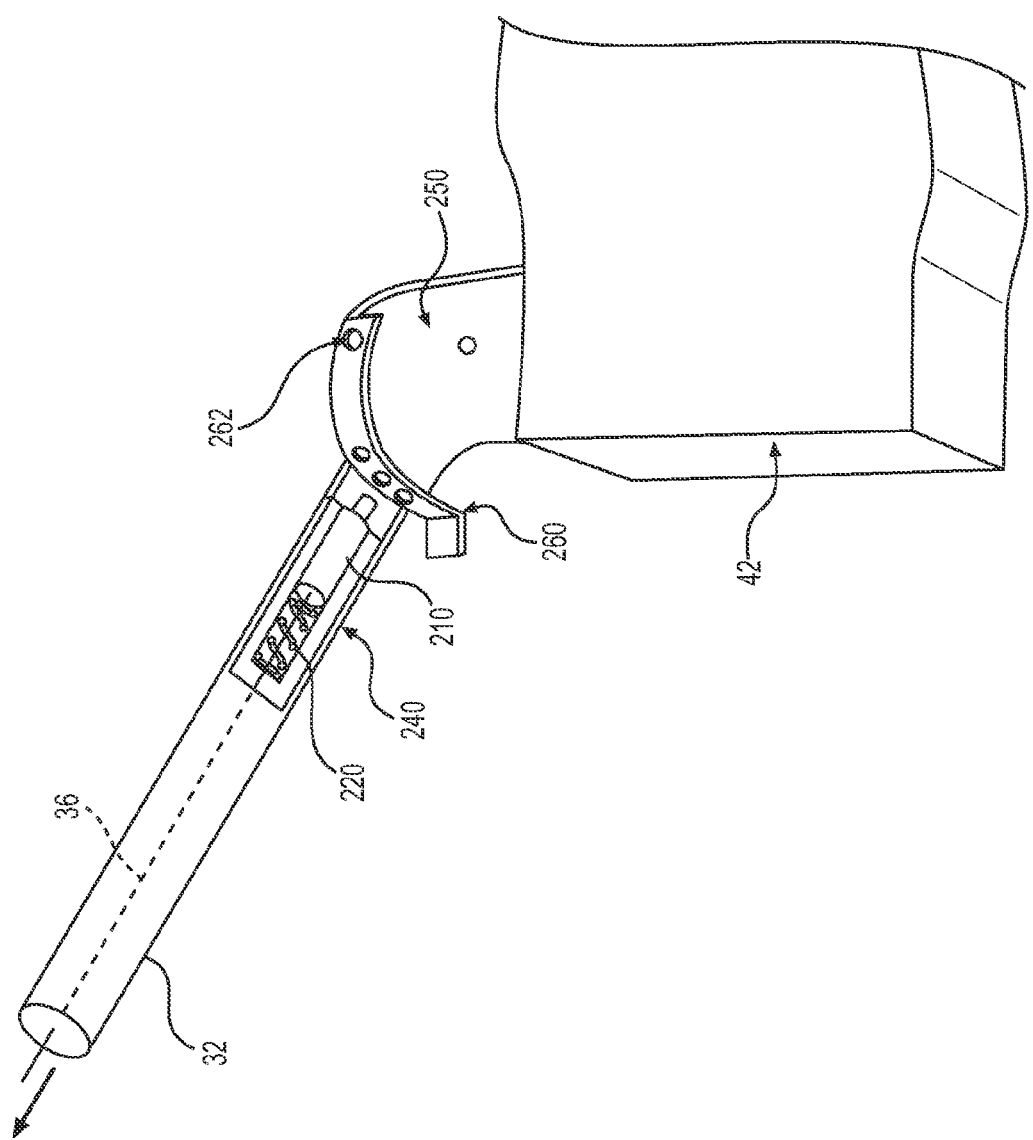
FIG. 5 illustrates a perspective view of another alternative structure for the handle rotation assembly according to an example embodiment.

FIG. 5 illustrates an embodiment similar to that of FIG. 4 insofar as the cables 36 are inside the handle members 32, and insofar as a cartridge 240 including the spring 220 and the pin 210 are also provided inside the handle members 32. However, a flanged handle adjustment bracket 250 is provided to replace the handle adjustment bracket 110 of FIGS. 1-4. The flanged handle adjustment bracket 250 may otherwise be substantially similar in shape to the handle adjustment bracket 110 except that a flange 260 with receiving holes 262 may be provided in place of the notches 122 in the arcuate portion 120.

Figure 6:
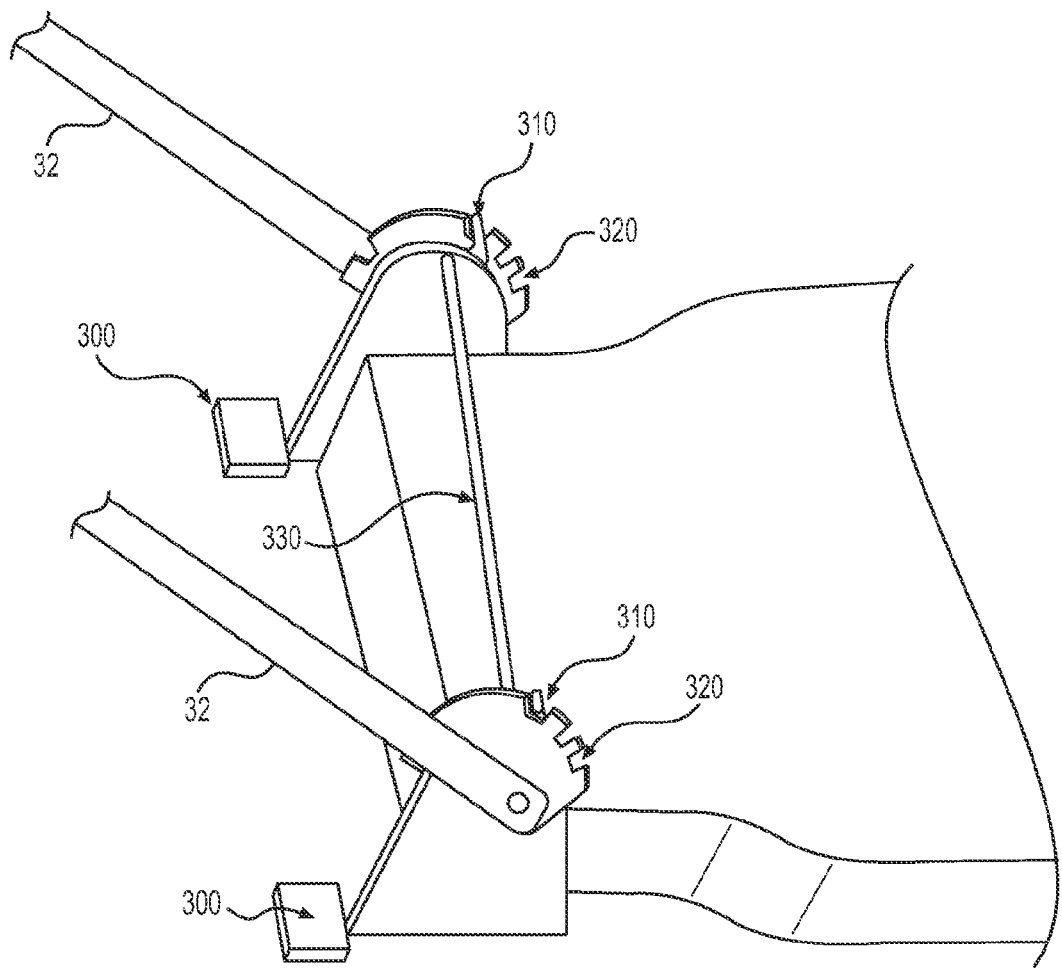
FIG. 6 illustrates a perspective view of still another alternative structure for the handle rotation assembly according to an example embodiment.
Figure 7:
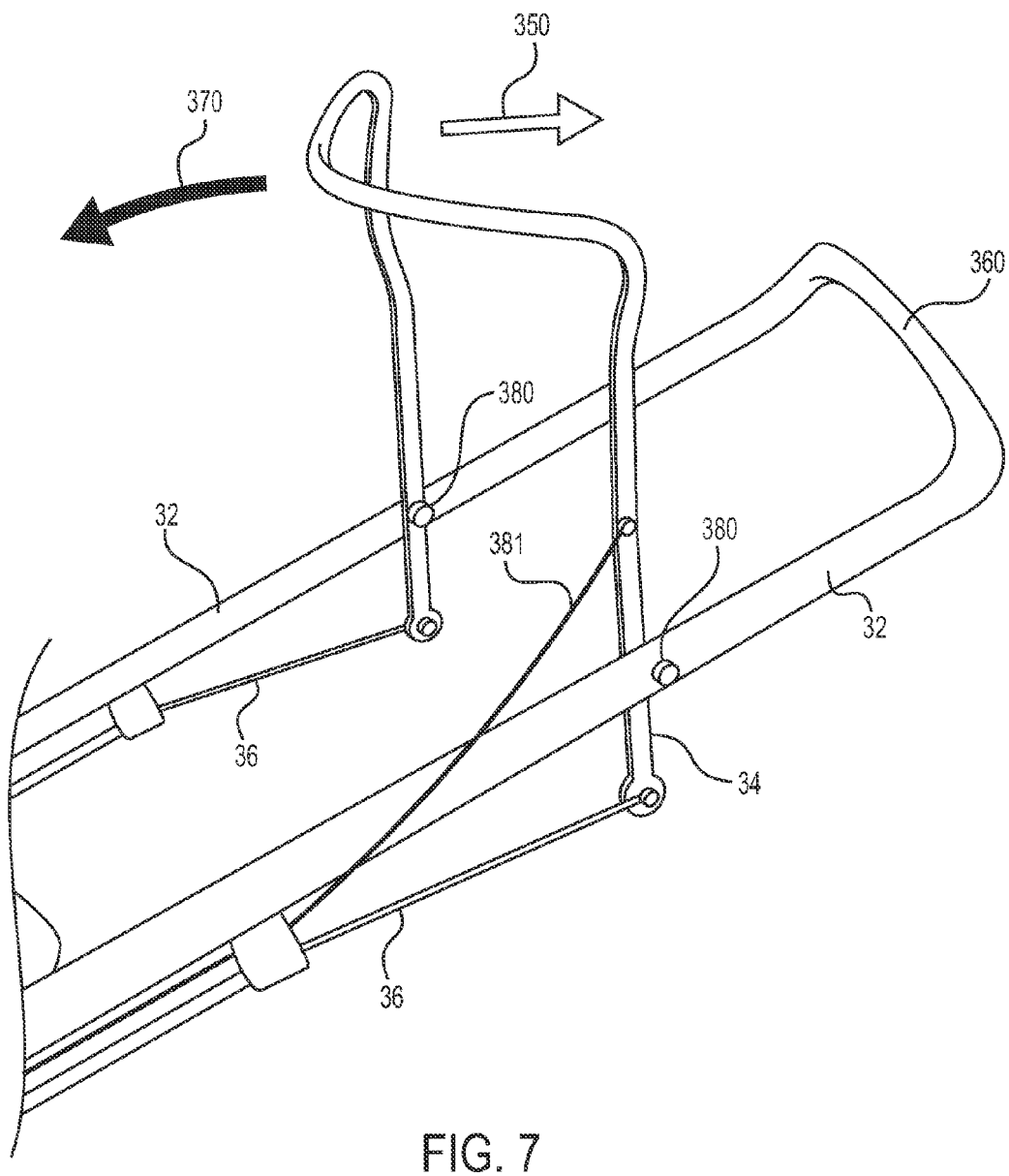
FIG. 7 illustrates a closer perspective view of an operator bail disposed at a handle assembly according to an example embodiment.

FIG. 6 illustrates an example embodiment in which, instead of using one of the cables 36 and remote actuation to enable rotation of the handle members 32, a local adjustment may be made using, for example a pedal 300 may be provided to lift a pin 310 out of notches or slots 320 to allow the handle members 32 to be rotated forward. As can be seen in FIG. 6, this type of rotation assembly may include a pivot bar 330 that extends to connect pins 310 on opposite sides of the mower. When the operator 12 steps on the pedal 300, the pins 310 may be rotated about the pivot bar 330 and lifted out of the slots 320 to allow rotation of the handle assembly.

FIG. 7 illustrates the operator bail 34 according to an example embodiment. The operator bail 34 in FIG. 7 is in the rest position. Pulling the operator bail 34 in the direction shown by arrow 350 to hold the operator bail 34 proximate to cross bar 360 may place the operator bail 34 into the pulled position. Meanwhile, pushing the operator bail 34 forward as shown by directional arrow 370 may place the operator bail 34 in the pushed position, which may provide tension on the cable 36 to actuate the ability to pivot the handle as described above in relation to the descriptions of FIGS. 2-6. In this example, the cables 36 are attached to distal ends of the operator bail 34, which are on an opposite side of the operator bail 34 relative to a pivot point 380 of the operator bail 34. If a presence function or other engine control functionality is provided using remote cable actuation when the operator bail 34 is in the pulled position, another cable (e.g., cable 381) or set of cables may be provided on the opposite side of the operator bail 34 relative to the pivot point 380 so that such cable or cables cause tension to be provided in the pulled position. The cables (36 and 381) may be affixed to the operator bail 34 at positions that are substantially equidistant from the pivot point 380 to provide substantially similar tension provision through the cables in the pushed position and the pulled position. However, if different tensions are desired, the distance from the pivot point 380 may be adjusted accordingly.

Figure 10:
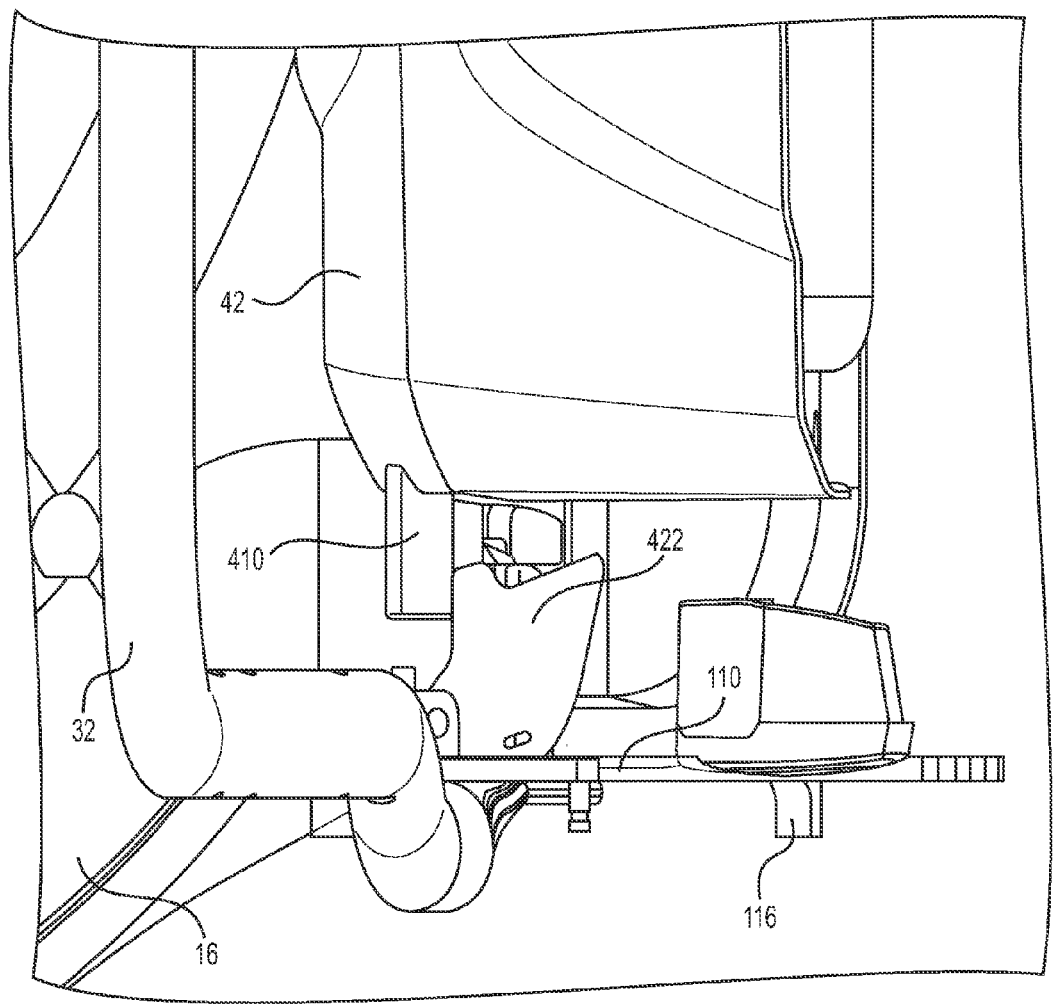
FIG. 10 illustrates a top view of the bag lifting assembly after rotation of the handle member to move a passive lift arm and thereby also lift the door in accordance with an example embodiment.
Figure 11:
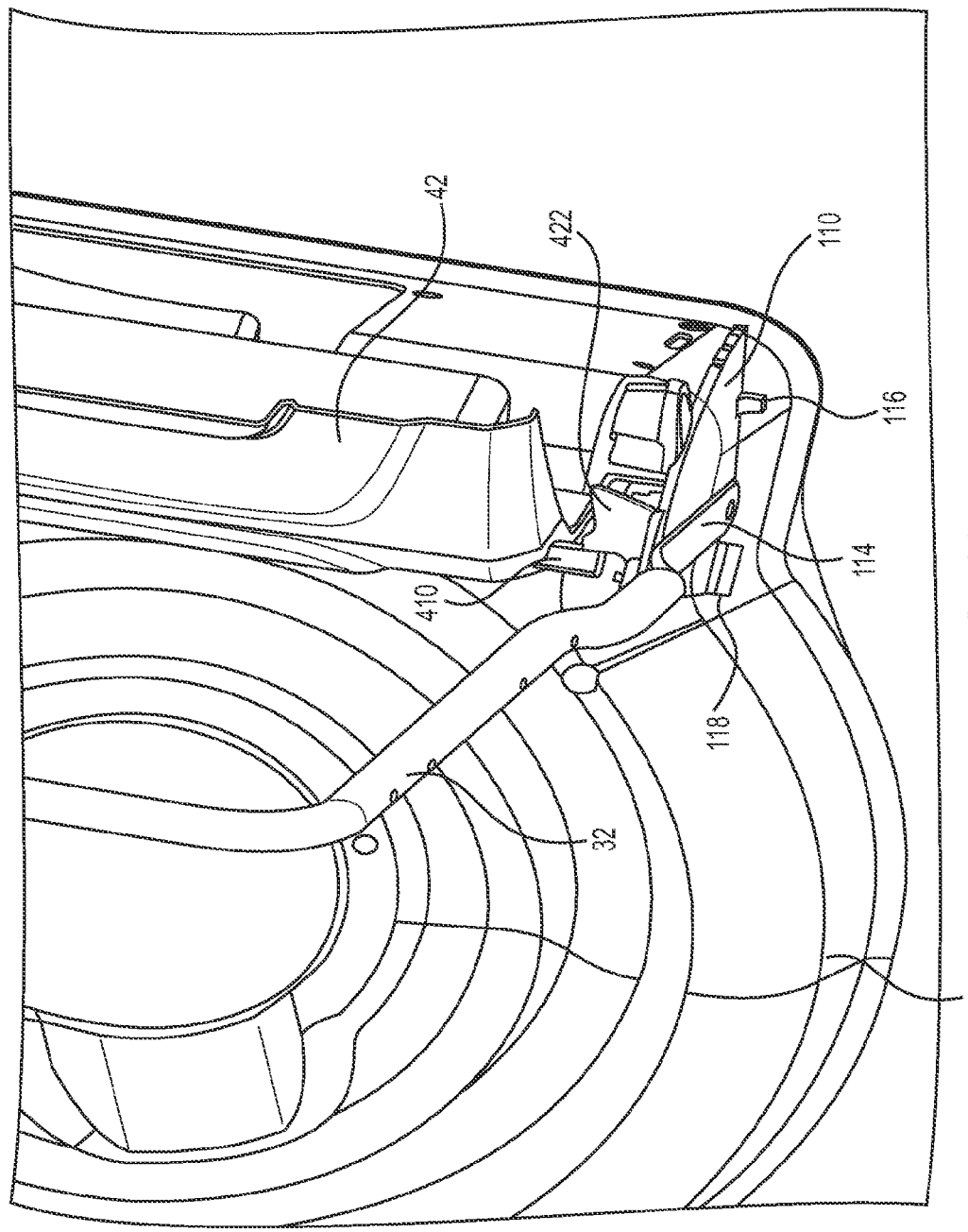
FIG. 11 illustrates a perspective view of the bag lifting assembly after rotation of the handle member to move a passive lift arm and thereby also lift the door in accordance with an example embodiment.
Figure 12:
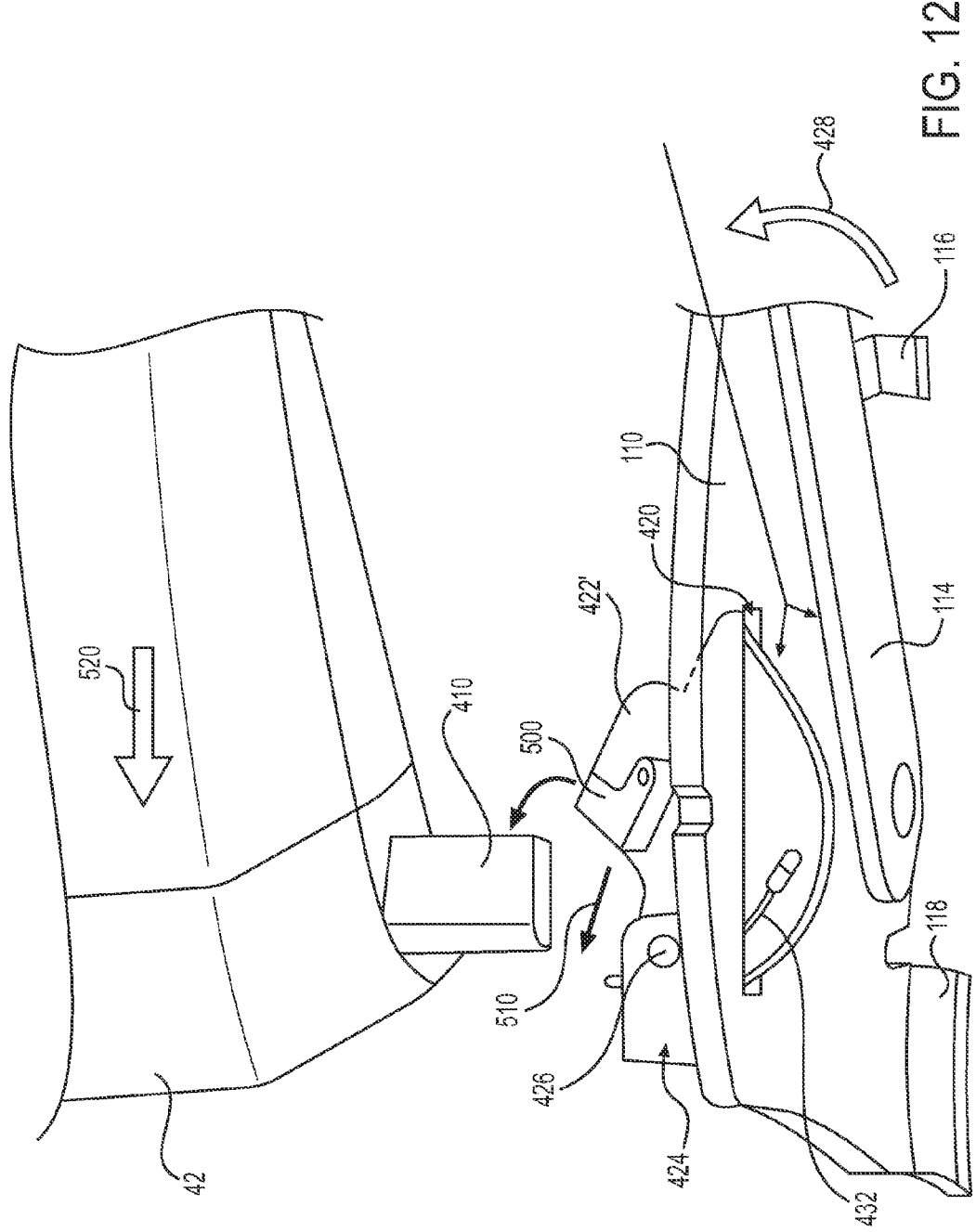
FIG. 12 illustrates a perspective view of an alternative structure for a lifting cam having a bypass lever in accordance with an example embodiment.
Figure 13:
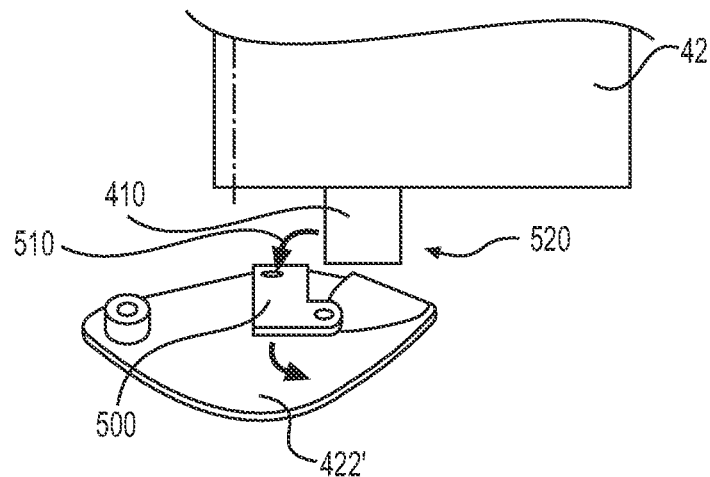
FIG. 13 shows the bypass lever of the lifting cam in a deflected position in accordance with an example embodiment.
Figure 14:
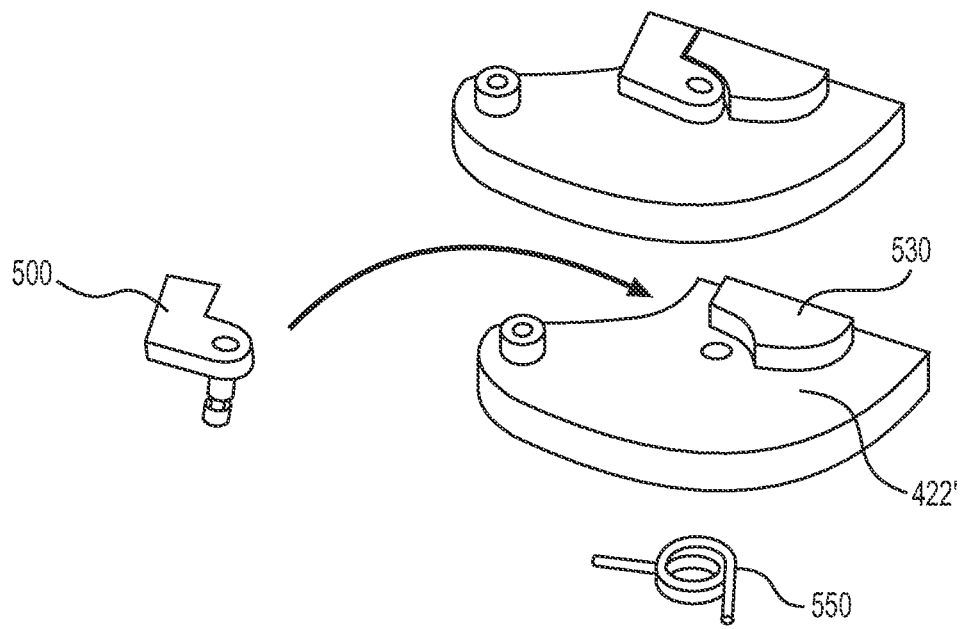
FIG. 14 shows an exploded view of the bypass lever of the lifting cam of an example embodiment.

As indicated above, the handle rotation assembly 50 of FIG. 1, and the various example structures provided in FIGS. 2-6 may be implemented in connection with the provision of a bag lifting assembly. When provided in this manner, the bag lifting assembly may utilize the rotation of the handle assembly to cause lifting of the door 42. Accordingly, a passive lift arm may be provided on the door 42, and the passive lift arm may be picked up or lifted by rotation of a cam assembly. The cam assembly may be rotated by the movement of the handle assembly. The cam assembly may include a rigid cam in some cases, such as is shown in the examples of FIGS. 8-11. However, in some cases, the cam may actually itself be an articulated or flexible member (at least when contacted by movement of the passive lift arm in one direction) as shown in the example of FIGS. 12-14.

Figure 8:
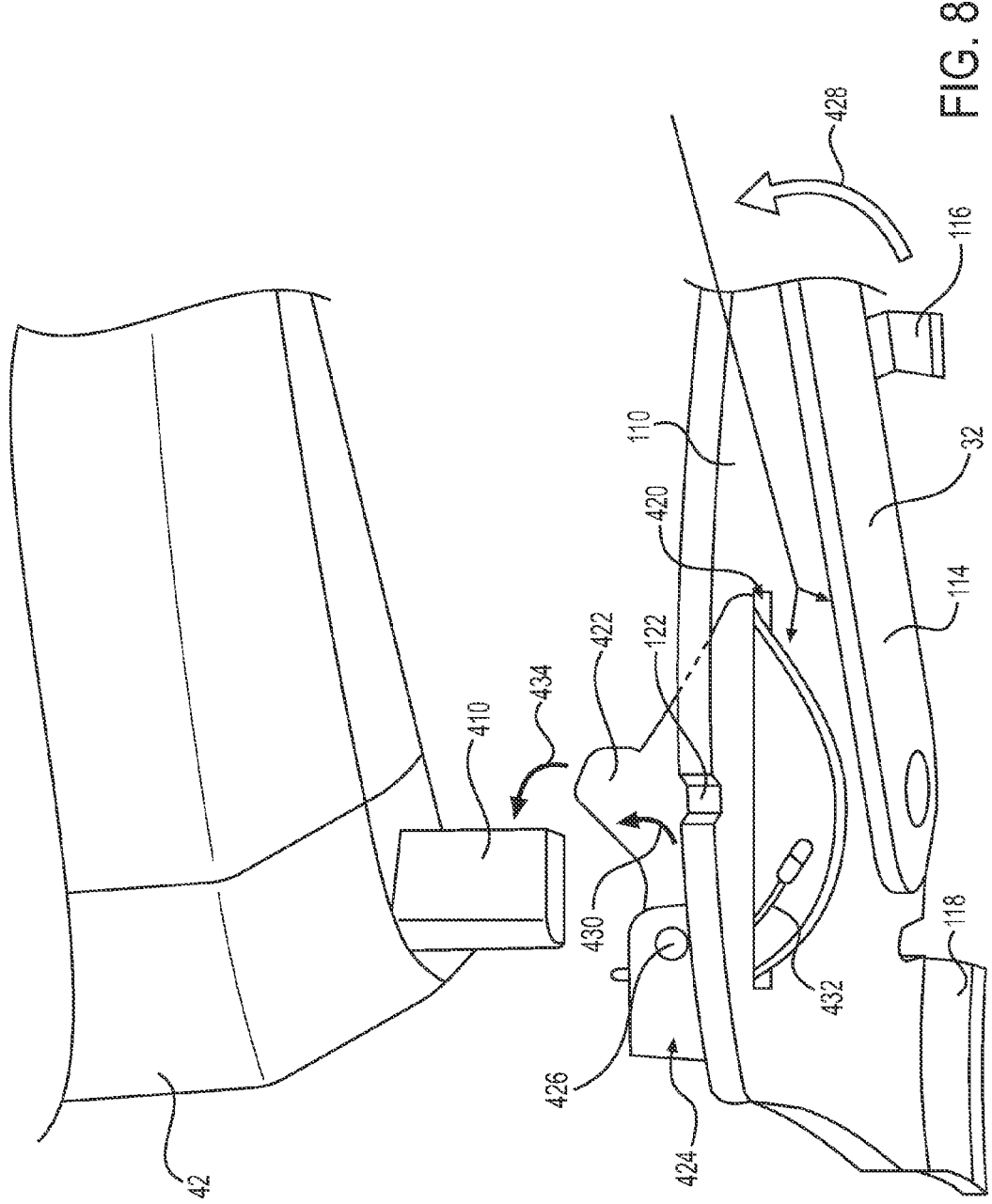
FIG. 8 illustrates a perspective view of components of a bag lifting assembly according to an example embodiment.
Figure 9:
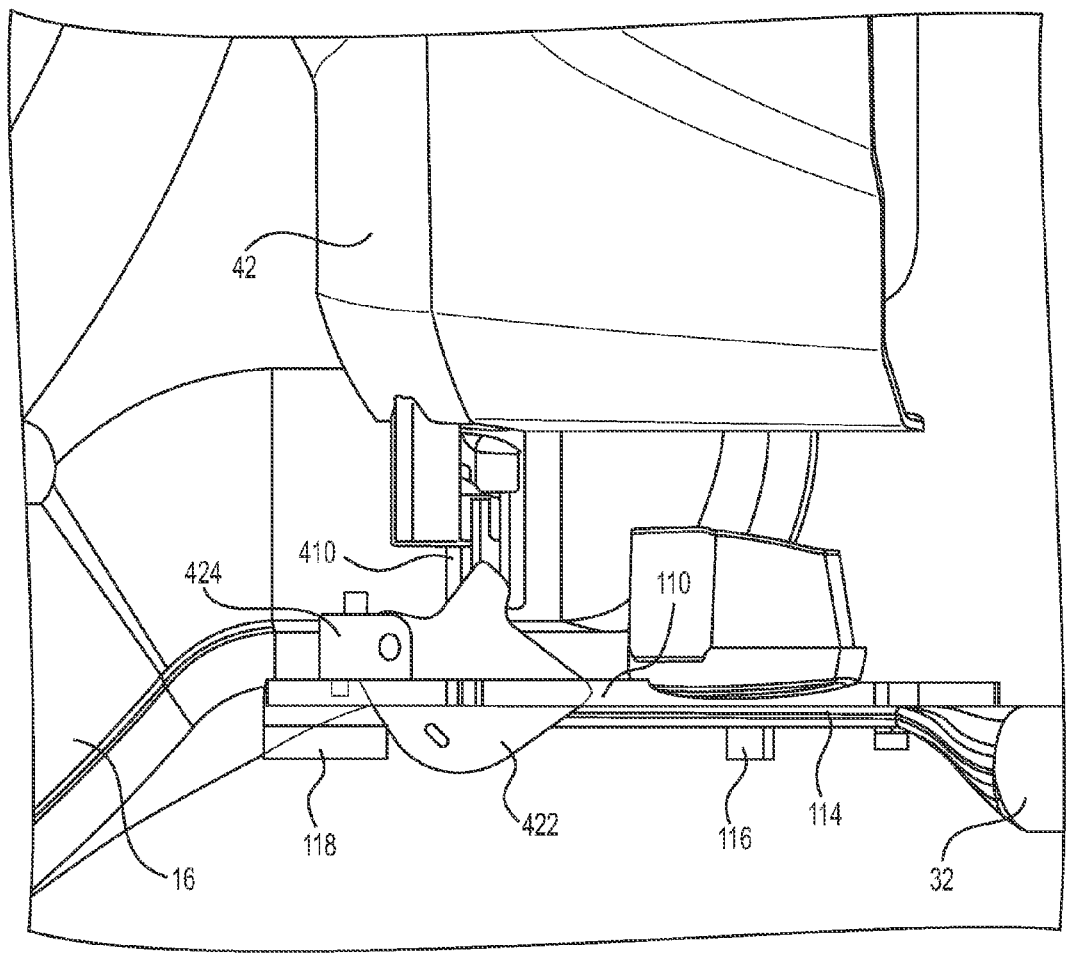
FIG. 9 illustrates a top view of the bag lifting assembly with the handle member in a normal operating position according to an example embodiment.

FIG. 8 illustrates a perspective view of components of a bag lifting assembly 400 according to an example embodiment. FIG. 9 illustrates a top view of the bag lifting assembly 400 with the handle member 32 in a normal operating position. FIG. 10 illustrates a top view of the bag lifting assembly 400 after rotation of the handle member 32 to move a passive lift arm 410 and thereby also lift the door 42. FIG. 11 illustrates a perspective view of the bag lifting assembly 400 after rotation of the handle member 32 to move a passive lift arm 410 and thereby also lift the door 42.

Referring to FIGS. 8-11, the handle adjustment bracket 110 may be provided with a slot 420 through which a lifting cam 422 may pass. The lifting cam 422 may be rotatably mounted to a cam bracket 424 that may be attached to the handle adjustment bracket 110. A pivot point 426 may be provided at the cam bracket 424 and the lifting cam 422 may be enabled to rotate about the pivot point 426 through the slot 420. In particular, for example, when the handle member 32 is rotated forward (e.g., as shown by arrow 428), the end portion 114 of the handle member 32 may contact the lifting cam 422. As the handle member 32 continues to rotate forward, the lifting cam 422 may be pushed farther through the slot 420 and pivot as shown by arrow 430. The lifting cam 422 may be biased to extend through the slot 420 toward the handle side of the handle adjustment bracket 110 by a biasing element 432 (e.g., a torsion spring). Thus, the rotation of the handle member 32 may overcome the biasing force of the biasing element 432. As the lifting cam 422 rotates responsive to movement of the handle as indicated by arrow 430, the lifting cam 422 may engage the passive lift arm 410 and rotate the door 42 open as indicated by arrow 434. If, for example, the handle member 32 is locked in a forward position (e.g., at notch 122), the handle member 32 will continue to hold the door 42 open so that the operator 12 can have easy access to the bagging attachment 40. The bagging attachment 40 can therefore be removed, emptied and/or attached without interference from the handle member 32. However, when the handle member 32 is moved rearward, the lifting cam 422 may be returned to its rest position by operation of the biasing element 432 and the door 42 may be replaced to its rest position in contact with the bagging attachment 40.

In an example embodiment, the handle member 32 may require rotation of at least a predetermined amount before the lifting cam 422 is contacted. Furthermore, in some embodiments, the lifting cam 422 may require at least a predetermined amount of rotation about the pivot point 426 before the passive lifting arm 410 is contacted. Thus, for example, when the door 42 is in a rest position on the bagging attachment 40 and the handle member 32 is in an operating position, there may be no contact between the handle member 32 and the lifting cam 422 or between the lifting cam 422 and the passive lifting arm 410. However, when the door 42 is lifted, there may be sustained contact between the handle member 32 and the lifting cam 422, and between the lifting cam 422 and the passive lifting arm 410.

The handle adjustment bracket 110 may be a metallic component. However, other materials could be used in some embodiments. In some cases, the lifting cam 422 may be a rigid plastic material. However, in other embodiments, metal or composite materials may be used. As shown in FIGS. 8-11, the lifting cam 422 may essentially be one unitary and rigid piece of material mounted to rotate about the pivot point 426 responsive to urging from movement of the handle member 32 forward (in the direction shown by arrow 428). When the door 42 is seated on top of the bagging attachment 40, the passive lifting arm 410 may be held at an elevation that enables the lifting cam 422 to pick up or engage with the passive lifting arm 410 when the lifting cam 422 rotates. For as long as the handle member 32 remains tilted forward to a substantially upright position to hold the lifting cam 422 in its fully rotated position, the door 42 may then be held in a lifted position so that the operator 12 can easily access the bagging attachment 40.

If the door 42 is not seated on top of the bagging attachment 40, however, the lifting cam 422 may not be aligned at the same elevation as the passive lifting arm 410 to be engaged by the lifting cam 422 when the lifting cam 422 is rotated responsive to movement of the handle member 32. Thus, for example, if the bagging attachment 40 is removed and the door 42 is allowed to rest proximate to a rear of the blade housing 16, the forward rotation of the handle member 32 to a substantially upright position would cause the lifting cam 422 to be rotated in the direction of arrow 430 and move to a fully rotated position. However, since the passive lifting arm 410 would be at a lower elevation (i.e., rotated downward below the elevation of the lifting cam 422), the lifting cam 422 would not contact or lift the passive lifting arm 410 (i.e., there would be no rotation of the door 42 in the direction shown by arrow 434). If the handle member 32 was to be maintained in the substantially upright orientation, the lifting cam 422 would then be maintained it a substantially fully rotated position and could block any attempt to manually open the door 42. Accordingly, some embodiments may provide for bypass functionality of the lifting cam 422.

In this regard, FIGS. 12-14 illustrate bypass functionality provided for an alternative embodiment of the lifting cam 422'. In this regard, FIG. 12 illustrates a perspective view of an alternative structure for a lifting cam having a bypass lever in accordance with an example embodiment. FIG. 13 shows the bypass lever of the lifting cam in a deflected position in accordance with an example embodiment. FIG. 14 shows an exploded view of the bypass lever of the lifting cam of an example embodiment. The lifting cam 422' of this embodiment includes a bypass lever 500 that may enable the door 42 to bypass the lifting cam 422' when the lifting cam 422' is in the fully rotated position. The lifting cam 422' may operate in the same way the lifting cam 422 of FIGS. 8-11 was described to operate above in connection with lifting of the passive lifting arm 410. The only exception is that the actual contact surface between the lifting cam 422' and the passive lifting arm 410 is provided by the bypass lever 500. Action of the bypass lever 500 for bypass functionality would normally only be initiated when the door 42 is attempted to be moved between a position at which the door 42 is proximate to the rear of the blade housing 16 and the operator 12 attempts to lift the door 42 manually to lock it in an elevated position to be held by the lifting cam 422' while the handle member 32 is substantially upright maintaining the lifting cam 422 in the fully rotated position.

In such an example, the bypass lever 500 may be enabled to move or pivot in the direction shown by arrow 510 to allow the passive lifting arm 410 to bypass the lifting cam 422' while the door 42 rotates in the direction shown by arrow 520. Thus, for example, the passive lifting arm 410 may displace or deflect the bypass lever 500 such that the lifting cam 422' remains fully rotated, but the bypass lever 500 gives or moves out of the way to allow the passive lifting arm 410 to move to the other side of the lifting cam 422'. After the passive lifting arm 410 rotates the bypass lever 500 to a deflected position (the deflected position of the bypass lever is shown in FIG. 13) and passes to the other side of the lifting cam 422', the bypass lever 500 may rotate back to its rest position (e.g., under spring pressure) so that the bypass lever 500 of the lifting cam 422' can then hold the door 42 in the elevated position by holding the passive lifting arm 410.

FIG. 14 shows an exploded view of the bypass lever 500 of the lifting cam 422' of an example embodiment. As shown in FIG. 13, the lifting cam 422' may include an elevated portion that comprises a lever seat 530. The lever seat 530 may block the bypass lever 500 from movement in a direction opposite to the direction of movement for the bypass lever 500 to achieve the deflected position. A biasing element 550 such as a torsion spring may be provided to bias the bypass lever 500 toward contact with the lever seat 530. Thus, when the bypass lever 500 is rotated toward the deflected position, spring pressure in the biasing element 550 may increase and, after the door 42 clears the lifting cam 422', the bypass lever 500 may be returned to its seated position proximate to the lever seat 530 so that the bypass lever 500 can support the door 42 in the elevated position.

In an example embodiment, a lawn mower may be provided. The lawn mower may include a blade housing configured to house at least one blade, an engine, a handle assembly, a door, and a bag lifting assembly. The blade housing may include an exit. The engine may be supported at least in part by the blade housing to selectively rotate the at least one blade. The handle assembly may guide operation of the lawn mower. The door may be rotatably disposed to have a first rest position in contact with a bagging attachment disposed to receive clippings from the blade housing and a second rest position proximate to the blade housing when the bagging attachment is removed. The bag lifting assembly may be configured to lift the door from the first rest position responsive to rotation of the handle assembly forward from an operating position.

In some cases, the handle assembly may be operably coupled to the blade housing via a handle adjustment bracket having a plurality of discrete lockable positions between which the handle assembly is rotatable. In an example embodiment, the door may include a passive lifting arm disposed to extend away from the door in a direction parallel to an axis of rotation of the door. The bag lifting assembly may include a lifting cam that rotates responsive to contact with the handle assembly as the handle assembly is rotated forward from the operating position to contact the passive lifting arm and rotate the door out from the first rest position. In some cases, one of the discrete lockable positions of the handle assembly may be located to hold the handle assembly in a substantially upright position. Responsive to the handle assembly being disposed in the substantially upright position, the lifting cam may hold the door in a third rest position where the door does not contact the bagging attachment. In some examples, the lifting cam may be disposed to be rotatable through a slot disposed in the handle adjustment bracket. In an example embodiment, the lifting cam further comprises a bypass lever disposed to rotate responsive to movement of the door from the first rest position to the third rest position. In some cases, the bypass lever is spring loaded to return to contact with a lever seat after movement to a deflected position responsive to movement of the door from the first rest position to the third rest position. In some embodiments, the lifting cam pivots through a range of motion substantially parallel to a ground plane while the handle assembly pivots through a range of motion defining a plane that is substantially perpendicular to the ground plane.

In accordance with another example embodiment, a lawn mower including a blade housing configured to house at least one blade, an engine, a handle assembly, and a handle rotation assembly is provided. The blade housing may include an exit. The engine may be supported at least in part by the blade housing to selectively rotate the at least one blade. The handle assembly may guide operation of the lawn mower. The handle rotation assembly may include a handle adjustment bracket and a retractable member. The handle adjustment bracket may have a plurality of discrete lockable positions between which the handle assembly is rotatable. The retractable member may be operably coupled to the handle assembly to selectively engage the handle adjustment bracket at a selected one of the discrete lockable positions based on operator action.

In an example embodiment, the handle adjustment bracket defines a substantially flat arcuate portion in which notches are provided to define the discrete lockable positions. In some cases, the retractable member comprises a pawl assembly having a pawl that is biased toward contact with the arcuate portion via a biasing element. Force of the biasing element may be overcome via operator action at the operator station to provide tension to a cable to rotate the pawl assembly against the force of the biasing element. In an example embodiment, the tension may be provided via operation of an operator bail coupled to the pawl assembly via the cable. The operator bail may be attached to the handle assembly at a pivot point such that the operator is enabled to push the operator bail away from the handle assembly to cause tension to be applied to the cable. In some cases, the retractable member comprises a pin assembly having a pin that is biased toward contact with the arcuate portion via a biasing element, and force of the biasing element is overcome via operator action at the operator station to provide tension to a cable to retract the pin assembly against the force of the biasing element. The pin assembly may be disposed within a handle member of the handle assembly. In an example embodiment, the handle adjustment bracket defines a substantially arcuate portion supporting a flange in which openings are provided to define the discrete lockable positions. In some embodiments, the retractable member may include a pin assembly having a pin that is biased toward contact with the arcuate portion via a biasing element, and force of the biasing element may be overcome via operator action at the operator station to provide tension to a cable to retract the pin assembly against the force of the biasing element. In various alternative embodiments, the cable may extend inside or outside a handle member of the handle assembly.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A lawn mower comprising:
a blade housing configured to house at least one blade;
an engine operably coupled to the blade housing to selectively rotate the at least one blade;
a handle assembly for guiding operation of the lawn mower;
a door rotatably disposed to have a first rest position in contact with a bagging attachment disposed to receive clippings from the blade housing and a second rest position proximate to the blade housing when the bagging attachment is removed, the door being rotatable about an axis of rotation; and
a door lifting assembly configured to lift the door from the first rest position responsive to rotation of the handle assembly forward from an operating position,
wherein the door lifting assembly comprises a lifting cam that rotates about a pivot axis responsive to contact with the handle assembly as the handle assembly is rotated forward from the operating position, and
wherein the pivot axis of the lifting cam is substantially perpendicular to the axis of rotation of the door.

2. The lawn mower of claim 1, wherein the handle assembly is operably coupled to the blade housing via a handle adjustment bracket having a plurality of discrete lockable positions between which the handle assembly is rotatable.

3. The lawn mower of claim 2, wherein the door comprises a passive lifting arm disposed to extend away from the door in a direction parallel to the axis of rotation of the door, and wherein lifting cam rotates responsive to contact with the handle assembly as the handle assembly is rotated forward from the operating position to contact the passive lifting arm and rotate the door away from the first rest position.

4. The lawn mower of claim 3, wherein one of the discrete lockable positions of the handle assembly is located to hold the handle assembly in a substantially upright position, and wherein responsive to the handle assembly being disposed in the substantially upright position, the lifting cam holds the door in a third rest position where the door does not contact the bagging attachment.

5. The lawn mower of claim 2, wherein the lifting cam is disposed to be rotatable through a slot disposed in the handle adjustment bracket.

6. The lawn mower of claim 1, wherein the lifting cam further comprises a bypass lever.

7. The lawn mower of claim 4, wherein the lifting cam further comprises a bypass lever disposed to rotate responsive to movement of the door from the first rest position to the third rest position while the handle assembly is in the substantially upright position and wherein the bypass lever is spring loaded to return to contact with a lever seat after movement to a deflected position responsive to movement of the door from the first rest position to the third rest position.

8. The lawn mower of claim 3, wherein the lifting cam pivots through a range of motion substantially parallel to a ground plane while the handle assembly pivots through a range of motion defining a plane that is substantially perpendicular to the ground plane.

9. The lawn mower of claim 3, wherein the lifting cam rotates at least a predetermined amount before the lifting cam engages the passive lifting arm.

10. The lawn mower of claim 9, wherein after the handle assembly establishes contact with the lifting cam and the lifting cam engages the passive lifting arm, the lifting cam sustains contact with the passive lifting arm during pivoting of the lifting cam as the handle assembly is rotated forward from the operating position.

11. The lawn mower of claim 3, wherein rotation of the lifting cam responsive to rotation of the handle assembly does not cause engagement between the lifting cam and the passive lifting arm when the door is in the second rest position.

12. The lawn mower of claim 3, wherein, responsive to the handle assembly being rotated forward from the operating position, the passive lifting arm engages the lifting cam when the door is in the first rest position and the passive lifting arm does not engage the lifting cam when the door is in the second rest position.

13. A lawn mower comprising:
a blade housing configured to house at least one blade;
an engine operably coupled to the blade housing to selectively rotate the at least one blade;
a handle assembly for guiding operation of the lawn mower;
a door rotatably disposed to have a first rest position in contact with a bagging attachment disposed to receive clippings from the blade housing and a second rest position proximate to the blade housing when the bagging attachment is removed, the door being rotatable about an axis of rotation; and
a door lifting assembly configured to lift the door from the first rest position responsive to rotation of the handle assembly forward from an operating position,
wherein the door lifting assembly comprises a lifting cam that rotates about a pivot axis responsive to contact with the handle assembly as the handle assembly is rotated forward from the operating position, and
wherein the lifting cam is not mounted on the handle assembly,
wherein the door comprises a passive lifting arm disposed to extend away from the door in a direction parallel to the axis of rotation of the door, and wherein the lifting cam rotates at least a predetermined amount before the lifting cam engages the passive lifting arm.

14. The lawn mower of claim 13, wherein the handle assembly is rotatable from the operating position via operation of a handle rotation assembly.

15. The lawn mower of claim 14, wherein the handle assembly is disengaged from the lifting cam in the operating position and establishes contact with the lifting cam responsive to operation of the handle rotation assembly to rotate the handle assembly forward from the operating position.

16. The lawn mower of claim 13, wherein after the handle assembly establishes contact with the lifting cam and the lifting cam engages the passive lifting arm, the lifting cam sustains contact with the passive lifting arm during pivoting of the lifting cam as the handle assembly is rotated forward from the operating position.

17. The lawn mower of claim 13, wherein rotation of the lifting cam responsive to rotation of the handle assembly does not cause engagement between the lifting cam and the passive lifting arm when the door is in the second rest position.

18. The lawn mower of claim 13, wherein, responsive to the handle assembly being rotated forward, the passive lifting arm engages the lifting cam when the door is in the first rest position and the passive lifting arm does not engage the lifting cam when the door is in the second rest position.

19. The lawn mower of claim 14, wherein the handle rotation assembly is configured to be positioned in a plurality of discrete lockable positions between which the handle assembly is rotatable.

20. The lawn mower of claim 13, wherein the lifting cam further comprises a bypass lever.

* * * * *